(12) United States Patent
Matsuura (10) Patent No.: US 7,289,566 B2
(45) Date of Patent: Oct. 30, 2007

(54) CABLE MODEM TUNER

(75) Inventor: Syuuji Matsuura, Ikoma (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 810 days.

(21) Appl. No.: 09/981,925

(22) Filed: Oct. 19, 2001

(65) Prior Publication Data

US 2002/0064238 A1    May 30, 2002

(30) Foreign Application Priority Data

Nov. 30, 2000    (JP) .............................. 2000-364554

(51) Int. Cl.
*H04B 3/00*    (2006.01)
(52) U.S. Cl. ...................... 375/257; 375/316
(58) Field of Classification Search ................ 375/257, 375/219, 220, 222, 316; 455/131, 232.1, 455/234.1, 313
See application file for complete search history.

(56) References Cited

U.S. PATENT DOCUMENTS

| 3,852,522 | A | * | 12/1974 | Martin ........................ 348/707 |
| 4,939,780 | A | * | 7/1990 | Ohtsubo ..................... 380/223 |
| 5,365,279 | A | * | 11/1994 | Harford ...................... 348/678 |
| 5,479,137 | A | * | 12/1995 | Harford .................... 331/117 R |
| 5,608,724 | A | * | 3/1997 | Green, Jr. .................... 370/307 |
| 6,160,571 | A | * | 12/2000 | Wang .......................... 725/127 |
| 6,396,550 | B1 | * | 5/2002 | Oh .............................. 348/735 |
| 6,433,639 | B1 | * | 8/2002 | Numanami et al. .......... 330/277 |
| 6,437,657 | B1 | * | 8/2002 | Jones ........................... 333/25 |
| 6,487,391 | B1 | * | 11/2002 | Park ........................... 455/3.02 |
| 6,714,776 | B1 | * | 3/2004 | Birleson ...................... 455/302 |
| 6,967,694 | B1 | * | 11/2005 | Ninomiya et al. ........... 348/726 |

FOREIGN PATENT DOCUMENTS

| EP | 0911962 A1 | 4/1999 |
| EP | 0920121 A1 | 6/1999 |
| EP | 1047192 A1 | 10/2000 |
| EP | 1128556 A2 | 8/2001 |
| JP | 4-29277 | 3/1992 |
| JP | A7-79390 | 3/1995 |
| JP | A8-331474 | 12/1996 |
| JP | 09-065236 | 3/1997 |
| JP | 10-294928 | 11/1998 |
| JP | 10-304261 | 11/1998 |
| JP | 11-127211 A | 5/1999 |
| JP | 11-163683 | 6/1999 |
| JP | 2000-040976 | 2/2000 |
| JP | 2000-151272 | 5/2000 |

* cited by examiner

*Primary Examiner*—Kevin Kim
(74) *Attorney, Agent, or Firm*—Birch, Stewart, Kolasch & Birch, LLP (57) ABSTRACT

An IF signal output from an IF amplifying circuit included in a tuner is converted to have a band width for transmission by an SAW filter and has unnecessary signals removed therefrom. Thereafter, the resulting signal has its gain made constant by an IFAGC circuit, amplified by an IF amplifying circuit, unnecessary band components are removed by a lowpass filter, and balanced IF signals are output from unbalance/balance converting circuit and provided to a QAM demodulating circuit.

1 Claim, 8 Drawing Sheets

CABLE MODEM TUNER

BACKGROUND OF THE INVENTION

1. Field of the Invention

The present invention relates to a cable modem tuner. More specifically, the present invention relates to a cable modem tuner suitable for outputting an intermediate frequency signal to a QAM (Quadrature Amplitude Modulation) demodulating circuit.

2. Description of the Background Art

In a cable television system (hereinafter referred to as CATV), introduction of HFC (Hybrid Fiber/Coax) has been in progress, in which a coaxial cable is kept as a subscriber's drop wire and the main network is implemented by optical fibers. This system attempts to provide broad-band data communication service of several Mbits/sec at home. Utilizing this system, it is possible to realize high speed data line having the transmission rate of 30 Mbits/sec with the bandwidth of 6 MHz using 64 QAM (Quadrature Amplitude Modulation). The cable modem is used in this system, and realizes high speed data communication of 4 Mbits/sec to 27 Mbits/sec, utilizing an unused channel of CATV. The cable modem tuner is used for a cable modem in such a CATV system, and after the received CATV signal is subjected to frequency conversion, it serves to take out the signal as an intermediate frequency signal.

Figure 8:
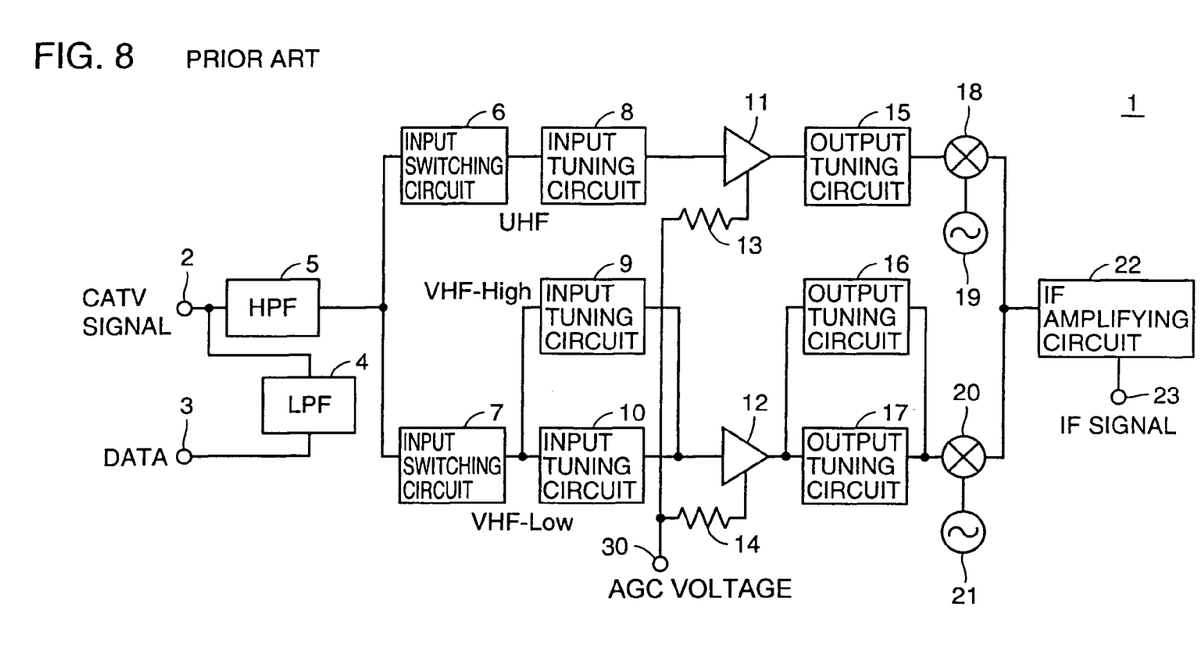
FIG. 8 is a block diagram of a conventional cable modem tuner.

FIG. 8 is a block diagram representing a configuration of a conventional cable modem tuner 1. Referring to FIG. 8, as for the CATV signals, an up signal transmitted to a station has the frequency of 5 MHz to 42 MHz, and a down signal transmitted from the station to the cable modem tuner has the frequency of 54 MHz to 860 MHz, and transmitted to a cable network through an input terminal 2 of the tuner. The up signal transmitted from the cable modem is received by a data receiver of the CATV station (system operator), and enters a computer of a center.

The cable modem tuner 1 includes a CATV signal input terminal 2 receiving the CATV signal as an input, a data terminal 3 receiving a data signal from a QPSK transmitter as an input, and an upstream circuit 4 provided between data terminal 3 and CATV signal input terminal 2.

In the cable modem, a data signal subjected to quadrature phase shift keying (QPSK) from a QPSK transmitter, for example, is input to data terminal 3 as the up signal. The data signal is transmitted through upstream circuit 4 to the CATV station.

The down signal input through input terminal 2 is divided into a UHF band receiving the frequency of 470 to 860 MHz, a VHF-High band receiving the frequency of 170 to 470 MHz and a VHF-Low band receiving the frequency of 54 to 170 MHz, and processed by receiving circuits provided for respective bands. Band ranges are not limited to those specified above.

The cable modem tuner 1 further includes a high pass filter (HPF) 5 having an attenuation range of 5 to 46 MHz and a pass band of not lower than 54 MHz, and input switching circuits 6 and 7 for allocating the signals passed through the high pass filter 5 to circuits corresponding to respective bands. The down signal is passed through high pass filter 5, the band is switched by the input switching circuits 6 and 7, and supplied to the circuitry corresponding to any of the aforementioned bands.

Cable modem tuner 1 further includes high frequency amplification input tuning circuits 8, 9 and 10 provided corresponding to respective bands; high frequency amplification circuits 11 and 12 provided corresponding to the UHF band and VHF band, respectively; high frequency amplification output tuning circuits 15, 16 and 17 provided corresponding to respective bands; a mixer circuit 18 and a local oscillation circuit 19 provided corresponding to the UHF band; a mixer circuit 20 and a local oscillation circuit 21 provided corresponding to the VHF band; and an intermediate frequency amplifying circuit 22 for amplifying, in the intermediate frequency band, outputs from mixer circuits 18 and 20.

The high frequency amplification input tuning circuits, the high frequency amplification circuits, the high frequency amplification output tuning circuits, the mixer circuits and the local oscillation circuits provided corresponding to respective bands are adapted such that dependent on the received channel, circuits corresponding to the received band are made operative, while the circuits corresponding to other bands are made inoperative. For example, when a UHF channel is received, the high frequency amplification input tuning circuit 8, the high frequency amplification circuit 11, high frequency amplification output tuning circuit 15, mixer circuit 18 and local oscillation circuit 19 for the UHF band are set to the operative state, while high frequency amplification input tuning circuits 9 and 10, high frequency amplification circuit 12, high frequency amplification output tuning circuits 16 and 17, mixer circuit 20 and local oscillation circuit 21 for the VHF-High and VHF-Low bands are set to inoperative state, and stop their operation.

The CATV signal input to the input terminal 2 is passed through high pass filter 5, and enters input switching circuits 6 and 7, where band switching takes place. The output therefrom is fed to high frequency amplification input tuning circuit 8, 9 or 10, where channel selection takes place. After channel selection, the signal is input to AGC terminal 24, amplified to a prescribed level by high frequency amplification circuit 11 or 12 based on the AGC voltage applied to resistance 13 or 14, supplied to high frequency output tuning circuit 15, 16 or 17, where the received signal is extracted.

Thereafter, the selected received signal is subjected to frequency conversion by mixer circuit 18, 20 and local oscillation circuit 19, 21 to an intermediate frequency (IF), and amplified by intermediate frequency amplification circuit 22. The intermediate frequency signal amplified by intermediate frequency amplifying circuit 22 is output from output terminal 23.

In this manner, in the conventional cable modem tuner 1, a received CATV signal is selected in accordance with the reception channel, and the signal after channel selection is subjected to frequency conversion and output as an IF signal from output terminal 23.

Handling of a QAM signal, which is a digital signal, and transmitting the IF signal output from output terminal 23 to a QAM demodulating circuit, not shown, for QAM demodulation by using such a cable modem tuner 1 has the following various problems.

First, it is necessary to input a high level IF signal of 50 dB or higher to an IC formed as a QAM demodulating circuit. In a recent QAM demodulating IC, performance of an ADC (Analog to Digital Converter) therein is improved, and it has become a general practice that the IC receives as an input a high level intermediate frequency signal. Further, an input circuit of the QAM demodulating IC contains an IF amplifying circuit and a fixed attenuation circuit. Therefore, performance has been improved at the level of ½ (0.5Vp-p), as compared with the conventional example. In the conventional single conversion tuner, however, the gain is around 30 dB, which is an insufficient level.

Further, generally, a balanced type input circuit comes to be used in the QAM demodulating ICs. This means that the tuner must provide balanced IF outputs. Conventionally, however, it provides unbalanced outputs.

Further, generally, an input signal level of about 0.5Vp-p is necessary for the QAM demodulating IC. The IF output of a conventional tuner, however, does not have such a level.

Further, the input level of the QAM demodulating IC must be constant for reception signals. In the conventional tuner, what is provided is RF-AGC only, and variation of the reception signal level at the tuner input end cannot be controlled satisfactorily.

Further, as the input level of the QAM demodulating IC is high, a high gain IF amplifying circuit is necessary. This leads to a problem that CPU clock noise and bus noise tend to enter, as QAM demodulating IC, CPU, IF amplifying circuit and the down converter circuit exist on one same substrate.

SUMMARY OF THE INVENTION

Therefore, an object of the present invention is to provide a cable modem tuner capable of outputting balanced intermediate frequency signals of high and constant level, to be applied to the QAM demodulating circuit.

In summary, the present invention provides a cable modem tuner including a tuner portion taking and amplifying a signal corresponding to a reception channel from input signals and outputting an intermediate frequency signal, a surface acoustic wave filter connected to an output of the tuner portion, a gain control and intermediate frequency amplifying circuit connected to an output of the surface acoustic wave filter, a lowpass filter connected to an output of the gain control and intermediate frequency amplifying circuit, and an output circuit connected to an output of the lowpass filter.

Therefore, according to the present invention, the IF signal to be applied to the QAM demodulating circuit can be secured to a constant level, and an IF signal can be provided even to a balanced type QAM demodulating circuit.

Preferably, the output circuit includes an unbalance/balance converting circuit converting unbalanced signals as outputs of the lowpass filter to balanced signals.

More preferably, the output circuit includes a differential amplifying circuit providing an output of the lowpass filter as balanced signals.

Preferably, the gain control and intermediate frequency amplifying circuit includes a dual gate type MOSFET amplifying circuit receiving an output of the surface acoustic wave filter.

Preferably, the gain control and intermediate frequency amplifying circuit includes a balanced type dual gate MOSFET amplifying circuit receiving an output of the surface acoustic wave filter.

More preferably, the gain control and intermediate frequency amplifying circuit includes a differential amplifying circuit receiving an output of the balanced dual gate type MOSFET amplifying circuit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
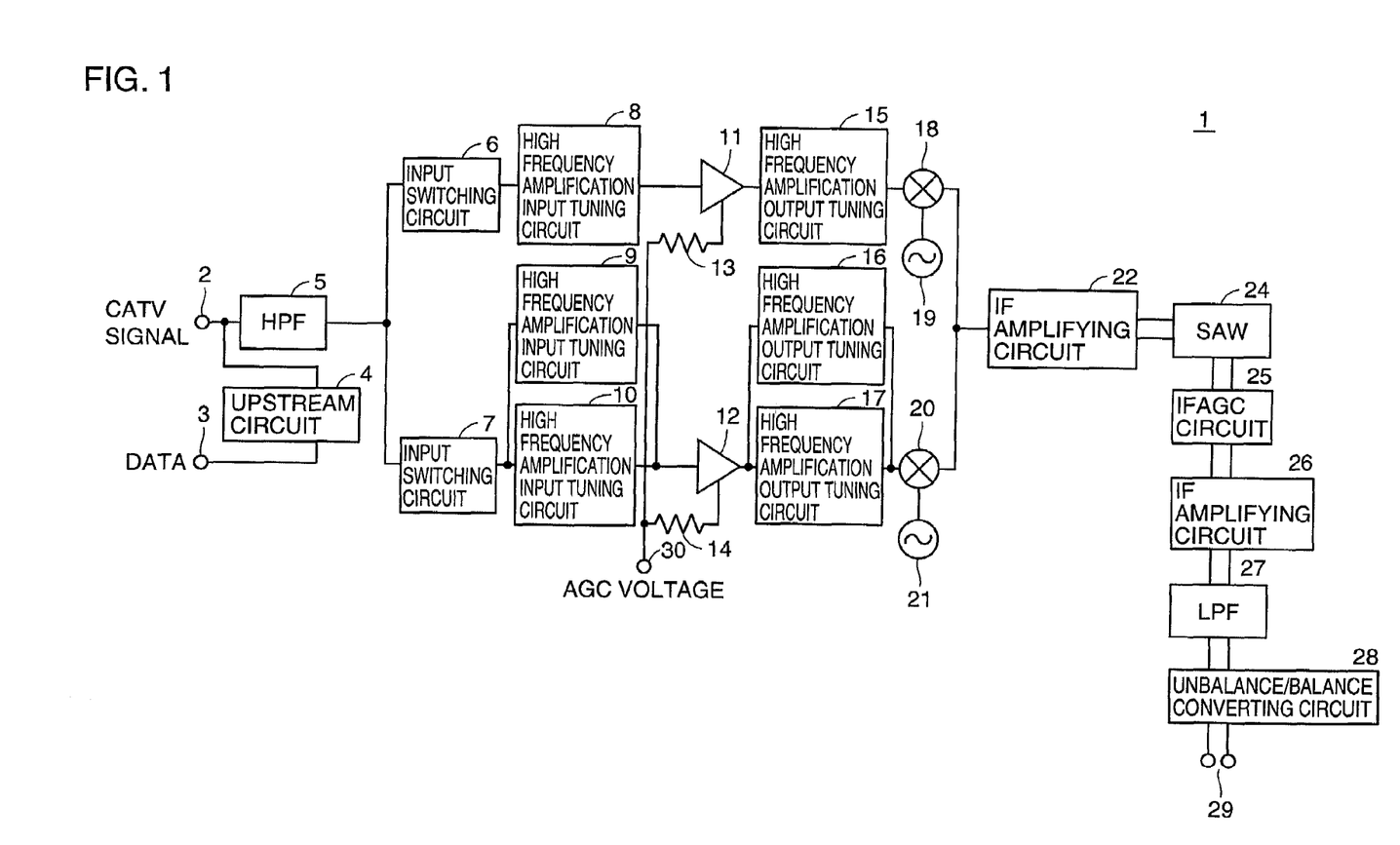
FIG. 1 is a block diagram showing an overall configuration of a cable modem tuner in accordance with one embodiment of the present invention.

FIG. 1 is a block diagram of the cable modem tuner in accordance with one embodiment of the present invention. In FIG. 1, the configuration of a tuner 1 from CATV signal input terminal 2 to IF amplifying circuit 22 is the same as the conventional example shown in FIG. 8. Therefore, detailed description thereof will not be repeated.

In the present embodiment, in order to provide balanced intermediate frequency signals having high and constant level to be input to an QAM demodulating circuit (not shown), a surface acoustic wave filter (SAW) 24, an IFAGC circuit 25, an IF amplifying circuit 26, a lowpass filter (LPF) 27 and an unbalance/balance converting circuit 28 are connected to an output of IF amplifying circuit 22. SAW removes components outside the intermediate frequency signal band, IFAGC circuit controls the gain of the intermediate frequency signal so that it is kept constant, IF amplifying circuit 26 amplifies the intermediate frequency signal thus made constant to a prescribed level, low pass filter 27 performs band limitation, and unbalance/balance converting circuit 28 converts unbalanced signals to balanced signals and thereafter provides the IF signals from IF output terminal 29 to be applied to the QAM demodulating circuit, not shown.

Figure 2:
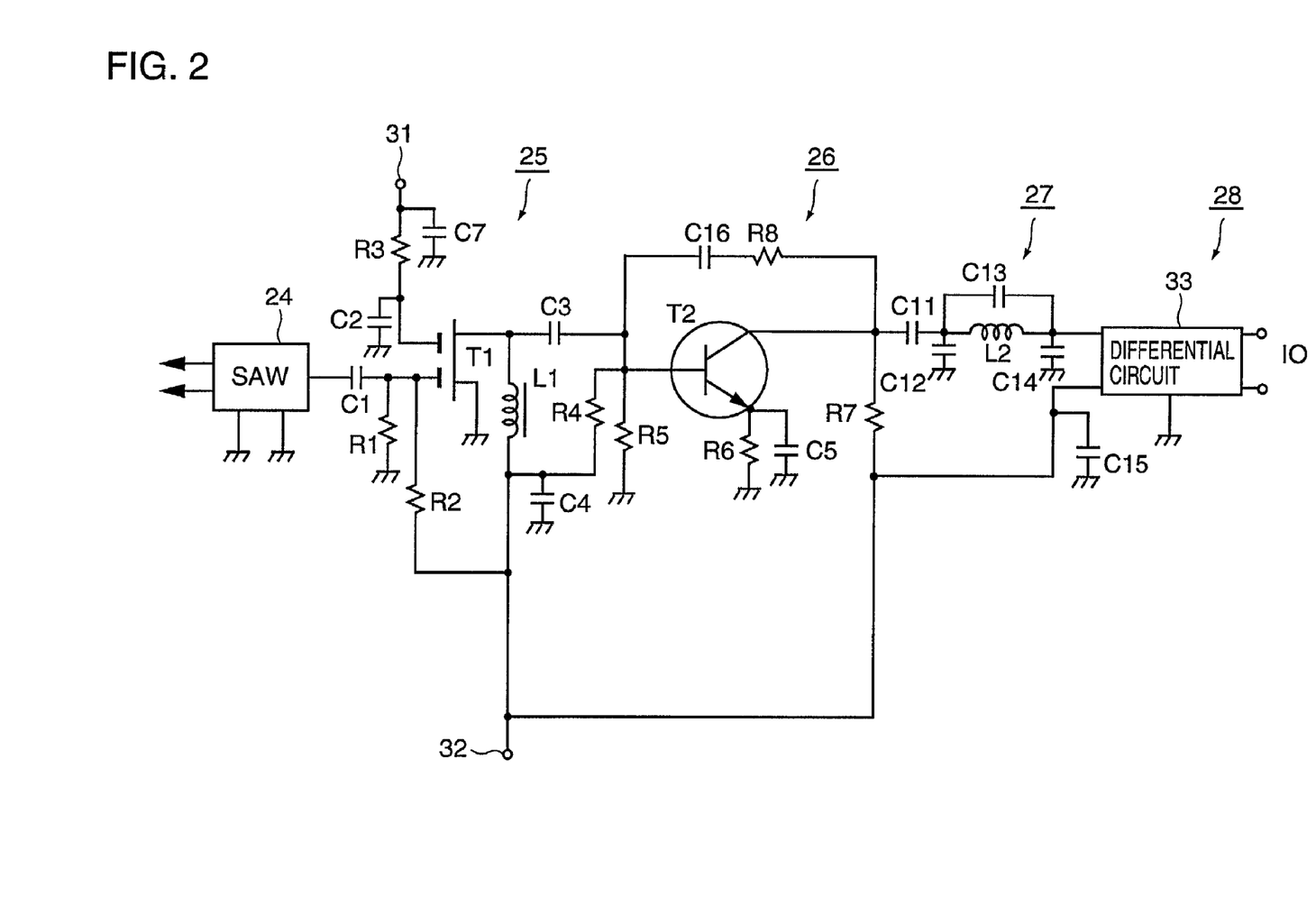
FIG. 2 is a schematic circuit diagram from an SAW filter to an unbalance/balance converting circuit shown in FIG. 1.

FIG. 2 is a specific circuit diagram from the SAW filter to unbalance/balance converting circuit shown in FIG. 1. Referring to FIG. 2, SAW filter 24 converts an IF signal received from IF amplifying circuit 22 shown in FIG. 1 to a band width for transmission and removes unnecessary signals. SAW filter 24 is a filter having the function of taking out voltage oscillation generated by surface acoustic waves, by means of electrodes attached on a surface of a piezo electric element, and resonance characteristic can be changed by changing the position and arrangement of the electrodes.

IFAGC circuit 25 receiving an output signal from SAW filter 24 includes a dual gate type MOSFET T1 receiving the output signal from SAW filter 24 and an AGC voltage input to an AGC terminal 31. Dualgate type MOSFET T1 amplifies, in accordance with the AGC voltage, the output signal from SAW filter 24. A resistance R3 is connected between AGC terminal 31 and one of the dual gates, and ground capacitors C7 and C2 are connected between AGC terminal 31 and the ground and between one of the dual gates and the ground, respectively.

Between SAW filter 24 and the other one of the dual gates, a capacitor C1 is connected to prevent DC component from entering the dual gate MOSFET T1. Between the other one of the dual gates and the ground, a resistance element R1 is connected, and between the other one of the dual gates and a power supply terminal 32, a gate bias resistance R2 is connected. Between an output of dual gate MOSFET T1 and power supply terminal 32, an inductor L1 is connected, which corresponds to a choke coil.

IF amplifying circuit 26 includes a bipolar transistor T2 amplifying an IF signal, and an output of dual gate MOSFET T1 is applied through DC preventing capacitor C3 to the base of a bipolar transistor T2. Between the base of bipolar transistor T2 and power supply terminal 32, a bias resistance R4 is connected, between the base and the ground, a bias resistance R5 is connected, between the emitter and the ground, a bias resistance R6 and a ground capacitor C5 are connected, and between the collector and the base, a series circuit including a feedback resistance R8 and a DC preventing capacitor C16 is connected.

To the collector of bipolar transistor T2, a power supply voltage is provided from power supply terminal 32 through a resistance R7. The amplifying circuit implemented by the bipolar transistor T2 has a sufficient dynamic range to perform gain adjustment.

In a succeeding stage of bipolar transistor T2, a π type lowpass filter 27 is connected. Lowpass filter 27 decreases local leakage from tuner 1, limits band of Gaussian noise and improves CNR. The lowpass filter includes a coil L2 and capacitors C12, C13 and C14 and connected to the collector of bipolar transistor T2 of the proceeding stage through DC preventing capacitor C11. Unbalance/balance converting circuit 28 is formed of a differential circuit 33 of an IC, which differential circuit 33 converts the IF signal to balanced outputs, and prescribed gain is provided.

Figure 3:
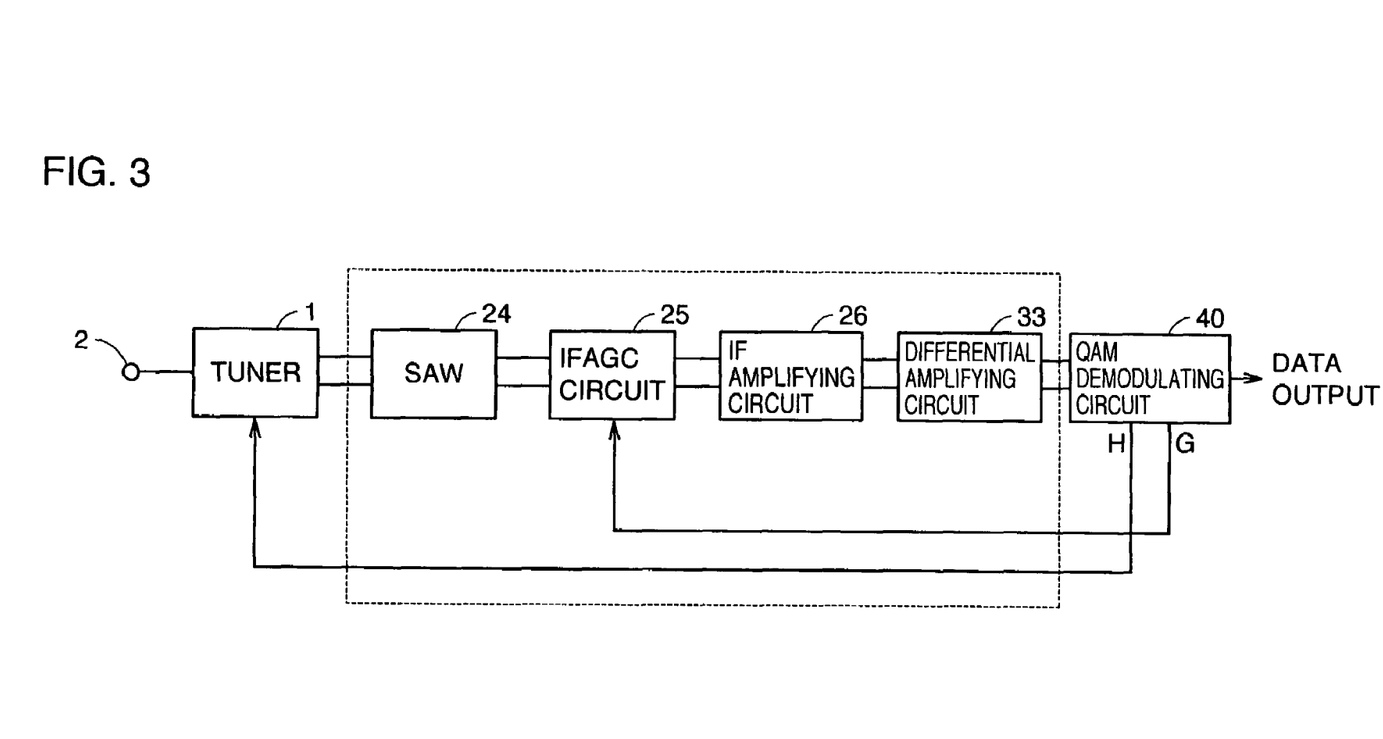
FIG. 3 is a block diagram showing an overall system of the present invention.

FIG. 3 is a block diagram showing an overall system of the present invention. Referring to FIG. 3, an output of tuner 1 is applied to QAM demodulating circuit 40 through SAW filter 24, IFAGC circuit 25, IF amplifying circuit 26 and differential amplifying circuit 33, as shown in FIG. 2.

An RFAGC voltage H is applied from QAM demodulating circuit 40 to tuner 1, an IFAGC voltage G is applied to IFAGC circuit 25, and controlled such that the overall gain is kept constant. QAM demodulating circuit 40 demodulates a balanced IF signal applied from differential amplifying circuit 33, and a bit stream signal of the demodulated output is supplied to an MPEG reproducing circuit or an MAC circuit of the succeeding stage, not shown, as a data signal.

Figure 4:
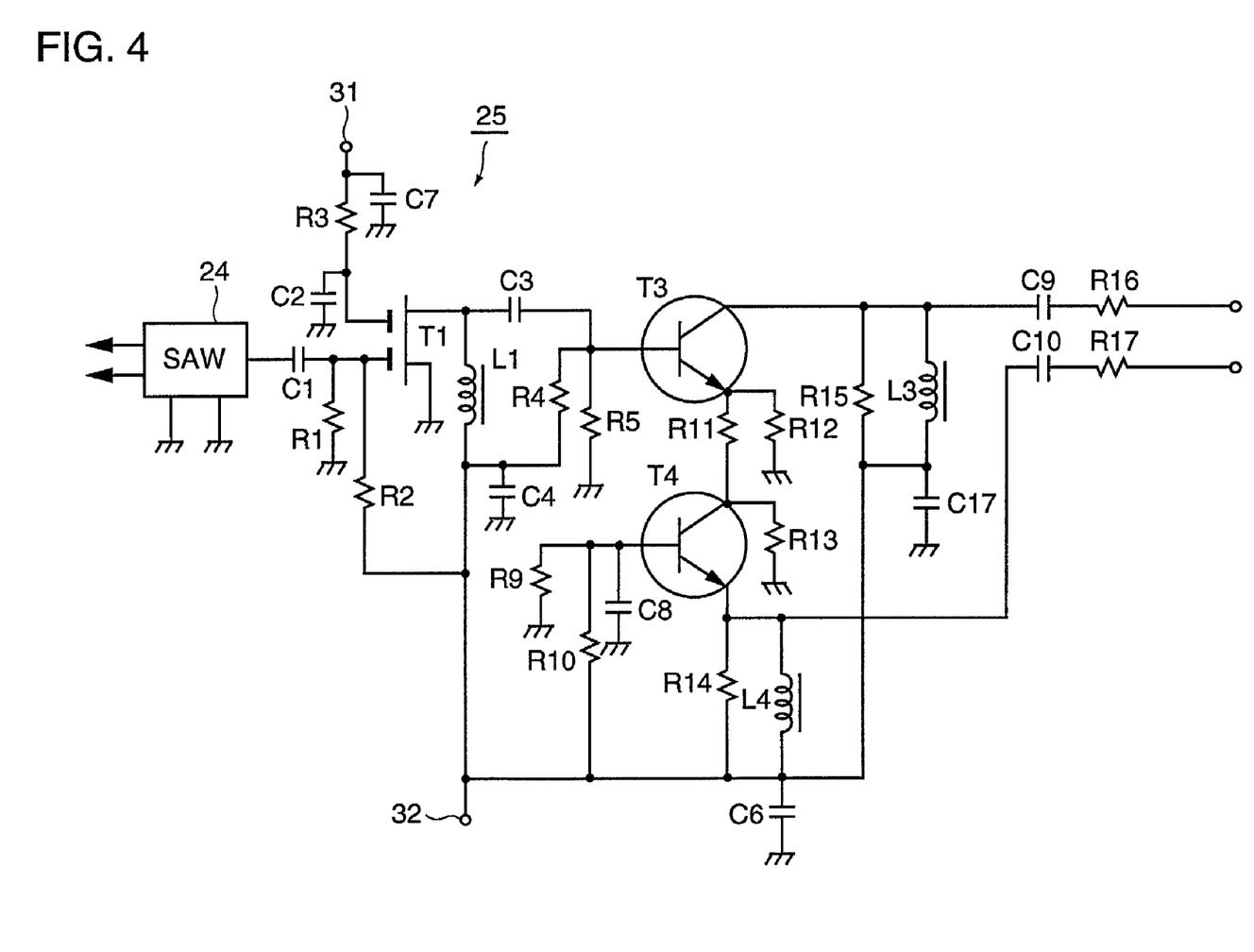
FIG. 4 is a circuit diagram showing another example from the SAW filter to the unbalance/balance converting circuit shown in FIG. 1.

FIG. 4 is a circuit diagram showing another example from the SAW filter to the unbalance/balance converting circuit shown in FIG. 1.

Unbalance/balance converting circuit 28 shown in FIG. 2 above is implemented by a differential amplifying circuit 33 in the form of an IC circuit. In the embodiment shown in FIG. 4, a differential amplifying circuit is formed by discrete type transistors T3 and T4, so as to reduce costs. Transistors T3 and T4 are connected emitter to emitter through a bias resistance R11, and between respective emitters and the ground, bias resistances R12 and R13 are connected. Between the collectors of transistors T3 and T4 and power supply terminal 32, high frequency choke coils L3, L4 and dumping resistances R14 and R15 are connected, respectively, and an output of dual gate MOSFET T1 is applied through DC preventing capacitor C3 to the base of transistor T3.

Bias resistances R9 and R10 and ground capacitor C8 each has one end connected to the base of transistor T4. Bias resistance R9 and ground capacitor C8 each has the other end grounded. Ground capacitors C6 and C17 are connected to the side of power supply terminal 32 of high frequency choke coils L3 and L4. From collectors of T3 and T4, balanced IF signals are externally output through DC preventing capacitors C9, C10 and buffer resistances R16 and R17.

As described above, in the embodiment shown in FIG. 4, a differential amplifying circuit is formed by transistors T3 and T4. Therefore, it becomes unnecessary to separately provide IF amplifying circuit 26 and differential amplifying circuit 33 as shown in FIG. 2.

Figure 5:
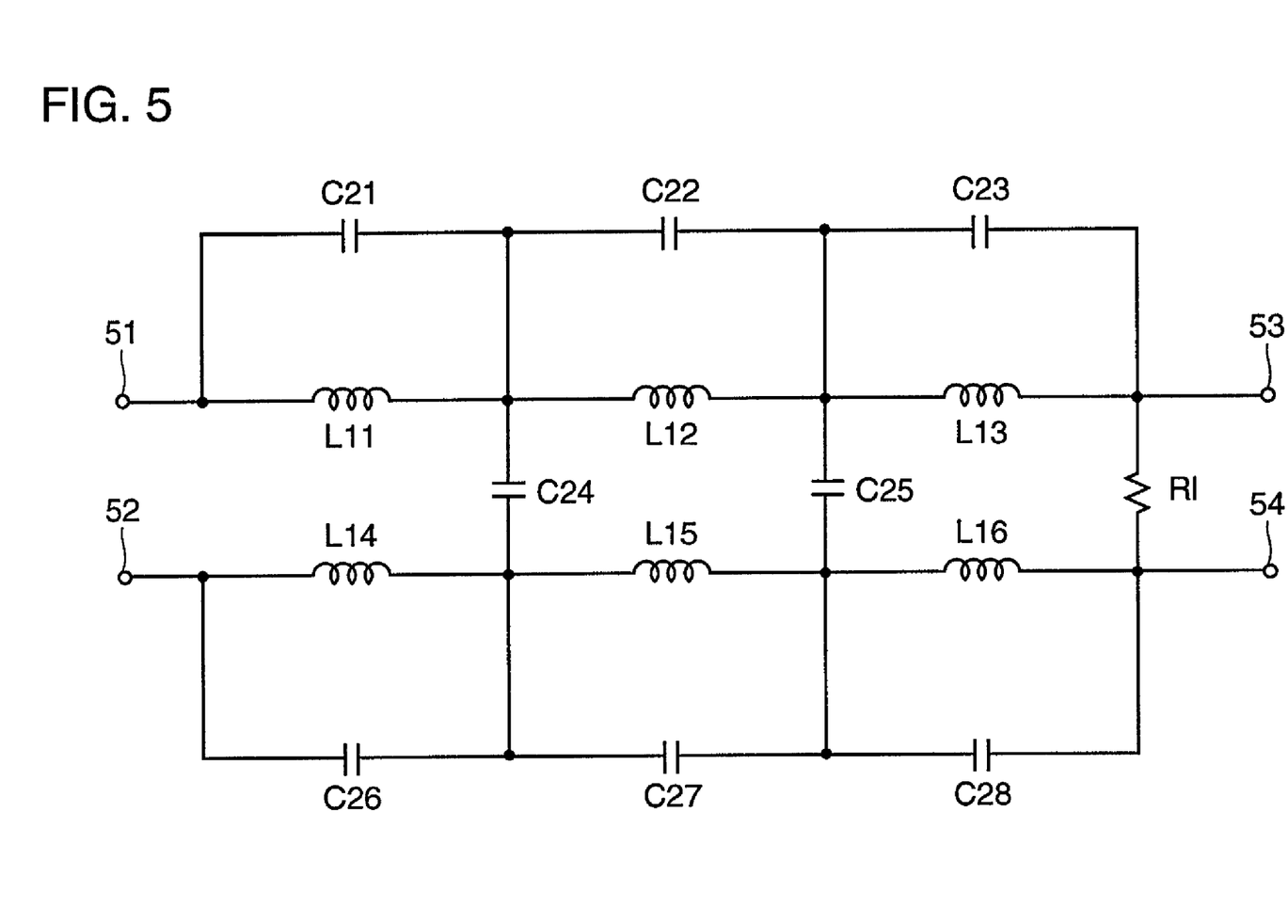
FIG. 5 is a circuit diagram showing an example of a lowpass filter connected to an output of the circuit shown in FIG. 4.

FIG. 5 is a circuit diagram showing an example of the lowpass filter connected to an output of the circuit shown in FIG. 4. As the differential amplifying circuit provides IF signals as balanced outputs, the lowpass filter shown in FIG. 5 is implemented by a balanced type LPF, so as to allow input of the balanced IF signals. More specifically, between one input terminal 51 to which the IF signal is input and an output terminal 53, coils L11, L12 and L13 are connected in series, and capacitors C21, C22 and C23 are connected in parallel with the coils L11, L12 and L13, respectively.

Between the other input terminal 25 and output terminal 54, coils L14, L15 and L16 are connected in series, and capacitors C26, C27 and C28 are connected in parallel with the coils, respectively. A capacitor C24 is connected to a node between coils L11 and L12 and a node between coils L14 and L15. A capacitor C25 is connected between a node between coils L12 and L13 and a node between coils L15 and L16. A terminal resistance R1 is connected between output terminals 53 and 54.

By forming a balanced lowpass filter in this manner, it is possible to limit the band from the balanced IF signal shown in FIG. 4.

Figure 6:
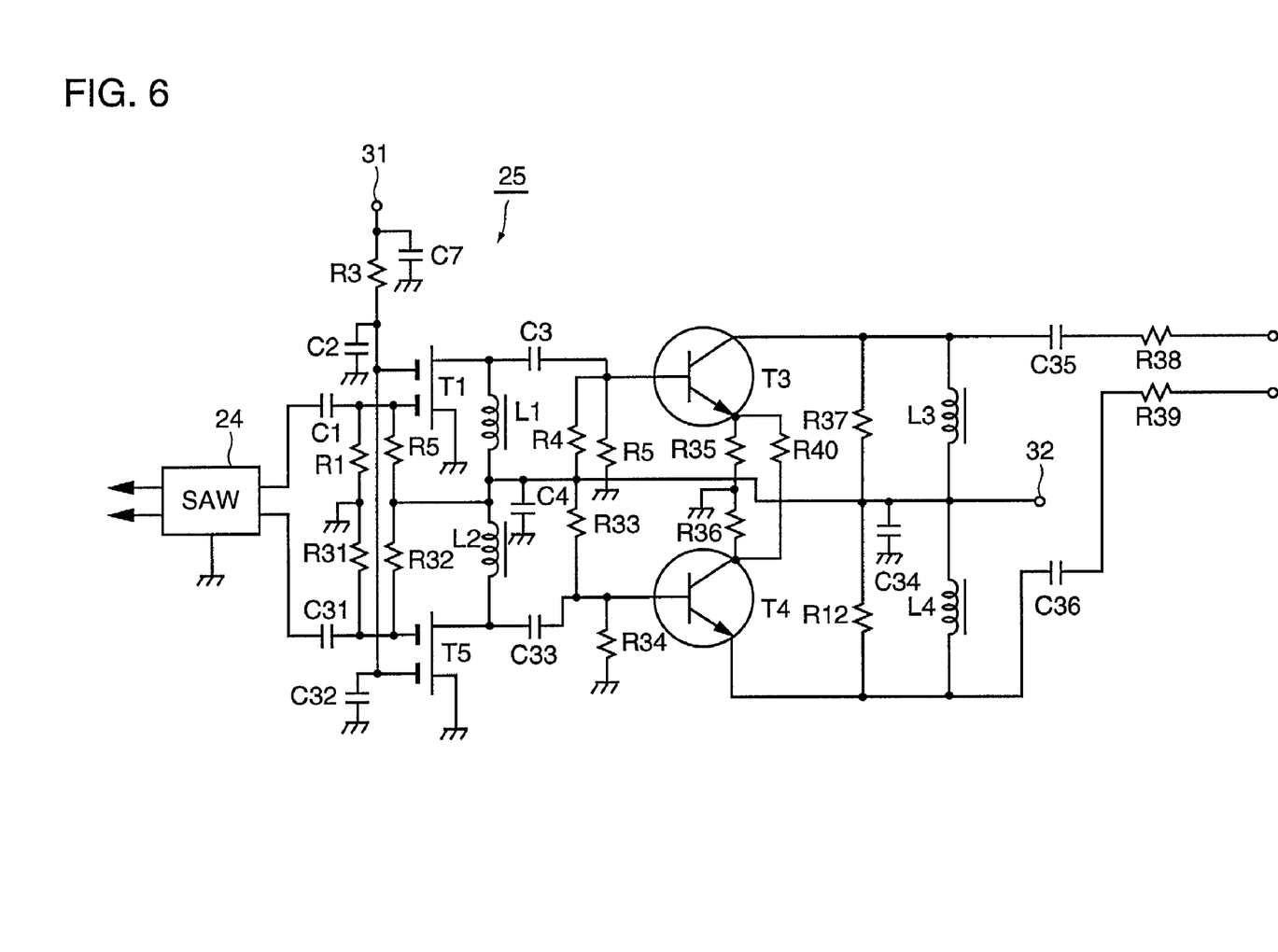
FIG. 6 is a circuit diagram showing an example in which an IFAGC circuit is implemented by a balanced type AGC circuit.

FIG. 6 is a circuit diagram showing an embodiment in which the IFAGC circuit is implemented by a balanced type AGC circuit. Referring to FIG. 6, SAW filter is generally formed to have balanced outputs. One output is input to one of the dual gates of the dual gate MOSFET T1 through DC preventing capacitor C1 in the similar manner as shown in FIG. 4, and the other output is input to one of the dual gates of dual gate MOSFET T5 through DC preventing capacitor C31. Between one of the dual gates and the ground, bias resistances R1 and R31 are connected, and between one of the dual gates and a power supply terminal 32, bias resistances R5 and R32 are connected.

To the other one of the dual gates, power is supplied from power supply terminal 31 through gate bias resistance R3. Between the gates and the ground, ground capacitors C2 and C32 are connected. Between respective outputs of dual gate MOSFETs T1 and T5 and power supply terminal 32, coils L1 and L2 are connected. Between the output of dual gate MOSFET Ti and the base of transistor T3, a DC preventing capacitor C3 is connected. Between the output of dual gate MOSFET T5 and the base of transistor T4, a DC preventing capacitor C33 is connected. Further, between the bases of transistors T3 and T4 and power supply terminal 32, bias resistances R4 and R33 are connected, and between respective bases and the ground, bias resistances R5 and R34 are connected.

Between the emitters of transistors T3 and T4 and the ground, resistances R35 and R36 are connected, and between the emitters a resistances R40 is connected. Further, between the collector of transistor T3 and power supply terminal 32, a bias resistance R37 and a coil L3 are connected, and between the collector of transistor T4 and power supply terminal 32, a bias resistance R12 and a coil L4 are connected. From the collectors of transistors T3 and T4, one of the IF balanced signals is output through DC preventing capacitor C35 and output buffer resistance R38, and the other one of the IF balanced signals is output through DC preventing capacitor C36 and output buffer resistance R39.

In the embodiment shown in FIG. 6, the IFAGC circuit is implemented by dual gate MOSFETs T1 and T2, IF amplification is attained by transistors T3 and T4, and IF balanced signals can be output. Here, it is desired that the devices of uniform characteristics are used for dual gate MOSFETs T1, T5 and transistors T3 and T4. This example is implemented completely by balanced circuits from input to output, and hence it is very advantageous in view of disturbance of unbalanced components and gain. As the SAW filter 24 is implemented by a balanced circuit, direct wave influence can be reduced and ripple characteristics can be improved.

Figure 7:
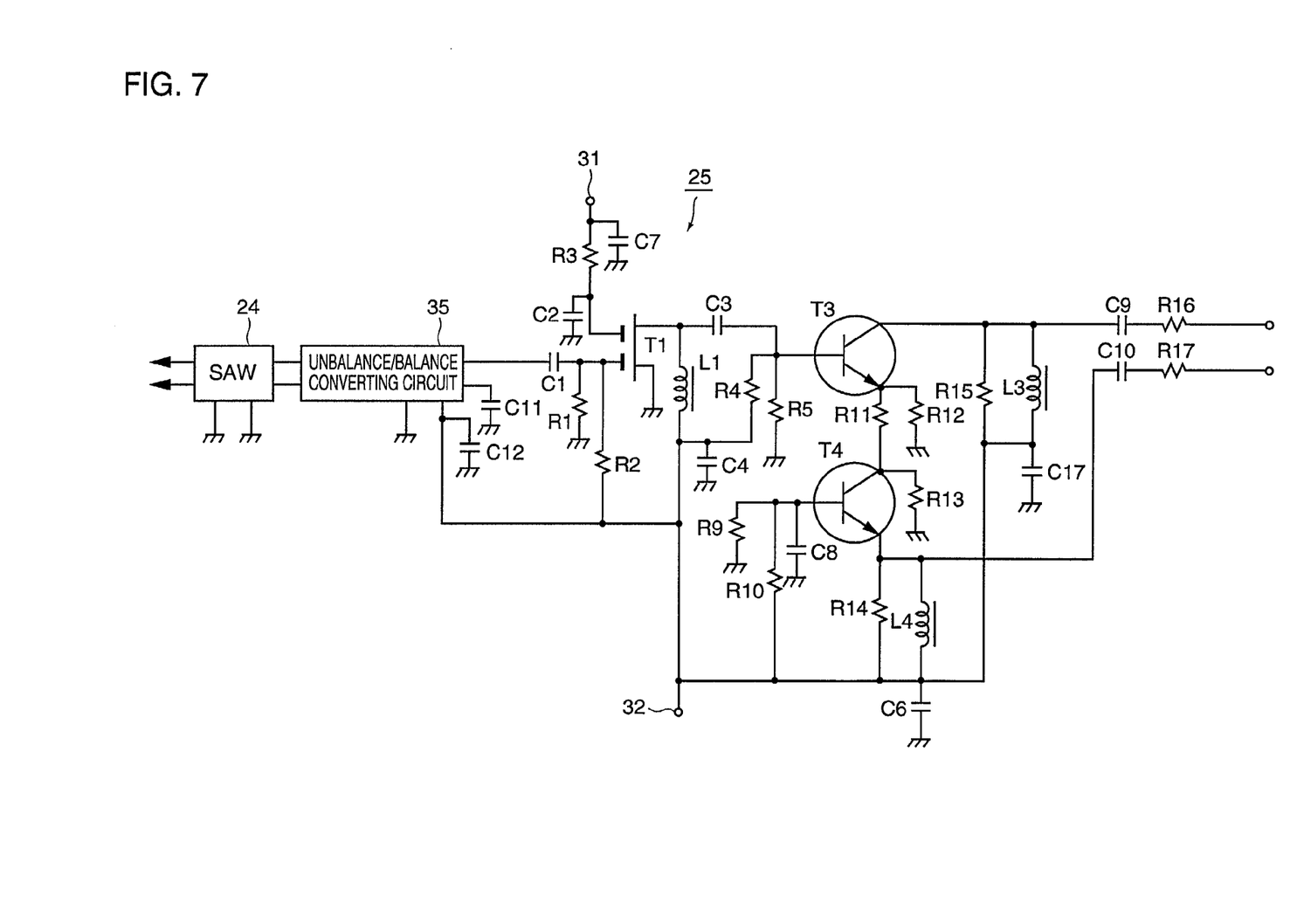
FIG. 7 is a circuit diagram showing a modification of the circuit shown in FIG. 4.

FIG. 7 is a circuit diagram showing a modification of the circuit shown in FIG. 4. In this embodiment shown in FIG. 7, an unbalance/balance converting circuit 35 in the form of an integrated circuit is added between SAW filter 24 and IFAGC circuit 25, and by the addition of this circuit, ripple characteristics can be improved and insufficient gain can be supplemented.

As described above, an input level of 0.5Vp-p is necessary for the QAM demodulating circuit, and therefore, a gain of at least 50 dB of the tuner has been necessary. The gain that could be obtained by the conventional tuner was around 30 dB, while in the present invention, the gain can be improved to 50 dB or higher, by the function of the balanced IF amplifier containing SAW filter 24.

Further, as an unbalance/balance converting IF output circuit is provided, the IF signal can be applied without any problem to a QAM demodulating circuit having a balanced type input circuit.

Further, it is possible to form SAW filter 24, IFAGC circuit 25 and balanced type IF amplifying circuit 26 such that the input level of the QAM demodulating circuit attains to 0.5Vp-p. Further, as the IFAGC amplifying circuit 25 is provided, it becomes possible to keep constant the input level of the QAM demodulating circuit with respect to the received signal.

As described above, according to the embodiment of the present invention, since the SAW filter, the AGC intermediate frequency amplifying circuit, the lowpass filter and the unbalance/balance circuit are connected to the output of the tuner, the IF signal to be applied to the QAM demodulating circuit can be maintained at a constant level and the IF signal can be provided even to a balanced type QAM demodulating circuit.

Although the present invention has been described and illustrated in detail, it is clearly understood that the same is by way of illustration and example only and is not to be taken by way of limitation, the spirit and scope of the present invention.

What is claimed is:

1. A cable modem tuner, comprising:
  a tuner portion taking and amplifying a signal corresponding to a reception channel from input signals, and converting to an intermediate frequency signal;
  a surface acoustic wave filter connected to an output of said tuner portion and limiting said intermediate frequency signal to a frequency band for transmission;
  a gain control unit connected to an output of said surface acoustic wave filter, including at least one dual gate type MOSFET and performing control based on an externally provided control voltage such that gain of said intermediate frequency signal is constant;
  an intermediate frequency amplifying unit connected to an output of said gain control unit and amplifying said intermediate frequency signal;
  a lowpass filter connected to an output of said intermediate frequency amplifying unit and limiting the output of said intermediate frequency amplifying unit by filtering out a signal out of a transmission band; and
  an unbalance/balance converting circuit connected to an output of said lowpass filter and converting an unbalanced signal into a balanced signal to output the balanced signal to a QAM demodulating circuit.

* * * * *